US012776571B2

(12) United States Patent
Kim et al.

(10) Patent No.: US 12,776,571 B2
(45) Date of Patent: Oct. 27, 2026

(54) SUBMINIATURE SATELLITE ANTENNA SYSTEM FOR UNMANNED AERIAL VEHICLES

(71) Applicant: KNS INC., Daejeon (KR)

(72) Inventors: Young Sun Kim, Daejeon (KR); Gil Sang Ryu, Daejeon (KR); Byung Wook Jin, Daejeon (KR)

(73) Assignee: KNS INC., Daejeon (KR)

( * ) Notice: Subject to any disclaimer, the term of this patent is extended or adjusted under 35 U.S.C. 154(b) by 195 days.

(21) Appl. No.: 18/714,733

(22) PCT Filed: Apr. 29, 2024

(86) PCT No.: PCT/KR2024/005801
§ 371 (c)(1),
(2) Date: May 30, 2024

(87) PCT Pub. No.: WO2025/225767
PCT Pub. Date: Oct. 30, 2025

(65) Prior Publication Data

US 2026/0121283 A1 Apr. 30, 2026

(30) Foreign Application Priority Data

Apr. 22, 2024 (KR) ........................ 10-2024-0053574

(51) Int. Cl.
*H01Q 1/28* (2006.01)
*B64U 20/83* (2023.01)
*G05D 1/656* (2024.01)
*G05D 109/25* (2024.01)
*H01Q 19/10* (2006.01)

(52) U.S. Cl.
CPC ............... *H01Q 1/28* (2013.01); *B64U 20/83* (2023.01); *G05D 1/656* (2024.01); *H01Q 19/10* (2013.01); *G05D 2109/254* (2024.01)

(58) Field of Classification Search
CPC .......... H01Q 1/28; H01Q 19/10; B64U 20/83; G05D 1/656
USPC ............................................................. 701/3
See application file for complete search history.

(56) References Cited

U.S. PATENT DOCUMENTS

| | | | | |
|---|---|---|---|---|
| 10,155,584 | B2 * | 12/2018 | Wang | B64C 25/06 |
| 10,526,065 | B2 * | 1/2020 | Thomassey | B64C 25/32 |
| 10,793,270 | B2 * | 10/2020 | Chen | B64U 20/50 |
| 2020/0158822 | A1 * | 5/2020 | Owens | H01Q 1/526 |
| 2024/0313850 | A1 * | 9/2024 | Gilbert-Eyres | G05D 1/106 |
| 2024/0429598 | A1 * | 12/2024 | Phillips | H01Q 1/28 |
| 2025/0253544 | A1 * | 8/2025 | Zhu | H01Q 9/285 |

FOREIGN PATENT DOCUMENTS

| | | | | |
|---|---|---|---|---|
| GB | 2589867 A * | 6/2021 | | H01Q 1/28 |
| KR | 10-2489885 B1 | 1/2023 | | |

* cited by examiner

*Primary Examiner* — Tuan C To
(74) *Attorney, Agent, or Firm* — The PL Law Group, PLLC

(57) ABSTRACT

A subminiature satellite antenna system for unmanned aerial vehicles includes an antenna for transmitting and receiving signals to and from a satellite, the antenna provided on an upper portion of a main body of a drone, a plurality of reflector plates for collecting signals to the antenna, the reflector plates installed separated from one another, and an antenna body provided on the main body of the drone, the antenna body mounted with a signal processing unit configured to process the signals transmitted and received by the antenna.

1 Claim, 2 Drawing Sheets

SUBMINIATURE SATELLITE ANTENNA SYSTEM FOR UNMANNED AERIAL VEHICLES

CROSS REFERENCE TO RELATED APPLICATION AND CLAIM OF PRIORITY

This application claims benefit under 35 U.S.C. 119, 120, 121, or 365 (c), and is a National Stage entry from International Application No. PCT/KR2024/005801, filed Apr. 29, 2024, which claims priority to the benefit of Korean Patent Application No. 10-2024-0053574 filed in the Korean Intellectual Property Office on Apr. 22, 2024, the entire contents of which are incorporated herein by reference.

BACKGROUND

1. Technical Field

The present invention relates to a satellite antenna system, more particularly to a subminiature satellite antenna system for unmanned aerial vehicles.

2. Background Art

Communications for naval and military functions generally employ satellite communication. In contrast, unmanned aerial vehicles such as drones and VTOL (vertical takeoff and landing) aircraft commonly use RF communication, which has a comparatively shorter effective distance. While an RF communication device can be manufactured in a subminiature size and thus can be easily mounted on an unmanned aerial vehicle, its working distance is within a maximum of about 20 km, and there are limits to its usage in practical applications such as for the Sea Fisheries Management Services, etc.

Since RF communications may be cut off in the event of war, there is a need to procure a satellite communication function as preparation for contingent events such as warfare, but it is difficult to mount a conventional satellite antenna onto an unmanned aerial vehicle (i.e., a drone) due to its size and weight.

SUMMARY

An aspect of the present invention, which was conceived to resolve the problem described above, is to provide a subminiature satellite antenna system for unmanned aerial vehicles that allows long-distance operations for an unmanned aerial vehicle utilizing satellite communication.

Other objectives of the present invention will be more clearly understood from the preferred embodiments set forth below.

One aspect of the invention provides a subminiature satellite antenna system for an unmanned aerial vehicle, where the subminiature satellite antenna system includes: an antenna for transmitting and receiving signals to and from a satellite, the antenna provided on an upper portion of a main body of a drone; a plurality of reflector plates for collecting signals to the antenna, the reflector plates installed separated from one another; and an antenna body provided on the main body of the drone, the antenna body mounted with a signal processing unit configured to process the signals transmitted and received by the antenna.

Here, the reflector plates can be formed in shapes of halved dishes and can be installed to face the antenna.

Also, the reflector plates can be secured in corresponding positions on the respective arms of the drone.

Also, a control unit mounted on the antenna body can additionally be included, where the control unit can be configured to control the flight of the drone such that the antenna faces a target satellite.

Also, the control unit can control the flight of the drone such that the drone moves only within an allowable range determined according to a target flight.

Also, the control unit can control the flight of the drone only when a reception strength or a signal-to-noise ratio of satellite signals received from the target satellite is below a threshold value.

Also, the control unit can control the flight of the drone by adjusting the pitch, roll, and azimuth of the drone, if the reception strength or the signal-to-noise ratio of the satellite signals received from the target satellite remains below the threshold value for a threshold duration or longer.

Other aspects, features, and advantages would be more clearly understood from the drawings, claims, and detailed description of the invention set forth below.

An embodiment of the invention can provide a subminiature satellite antenna system, which can be mounted on an unmanned aerial vehicle to allow long-distance operations utilizing satellite communication.

DETAILED DESCRIPTION

Figure 1:
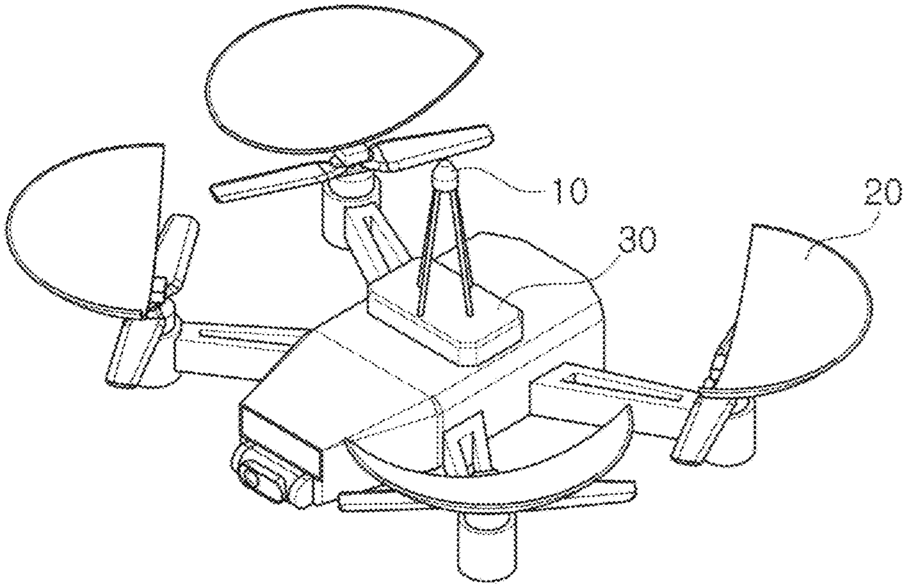
FIG. 1 and FIG. 2 illustrate a subminiature satellite antenna system mounted on an unmanned aerial vehicle according to an embodiment of the invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed by the present invention.

When a component is mentioned as being "coupled" or "connected" to another component, this may mean that the component is directly coupled or connected to the other component or may mean that they are coupled or connected with still another component in-between. On the other hand, if a component is mentioned as being "directly coupled" or "directly connected" to another component, this should be understood as meaning that there are no other components between the mentioned components.

While such terms as "first" and "second," etc., can be used to describe various components, such components are not to be limited by the above terms. The above terms are used only to distinguish one component from another. For example, terms such as a first threshold value, a second threshold value, etc., used below may refer to threshold values that are pre-designated to be substantially different or partially the same. Since there is a risk of confusion arising if these concepts were to be referred to by the same term "threshold value", the ordinal numbers first, second, etc., are added to more easily differentiate the concepts.

The terms used in the present specification are merely used to describe particular embodiments and are not intended to limit the present invention. An expression used in the singular encompasses the expression of the plural, unless it has a clearly different meaning in the context. In the present specification, it is to be understood that terms such as "including" or "having," etc., are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

Also, the components of an embodiment described with reference to each drawing are not necessarily applied exclusively to the corresponding embodiment and can be implemented so as to be included in another embodiment as long as the spirit of the invention is maintained. Moreover, is should be appreciated that multiple embodiments can be implemented as a single combined embodiment, even though it is not expressly stated as such.

In describing the appended drawings, the same components are assigned the same or related reference numerals regardless of the figure number, and redundant explanations are omitted. In the description of the present invention, certain detailed explanations of the related art are omitted if it is deemed that they may unnecessarily obscure the essence of the invention.

Figure 2:
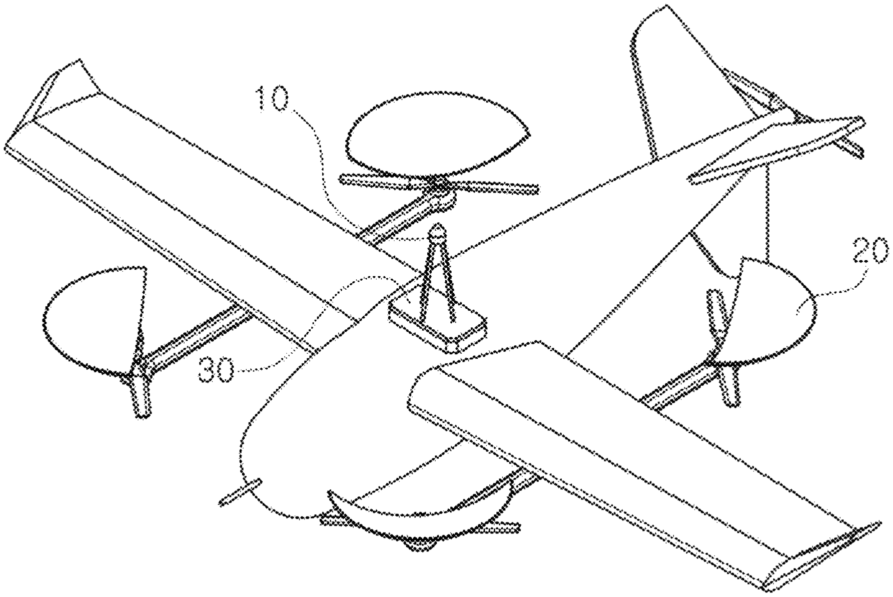
Figure 3:
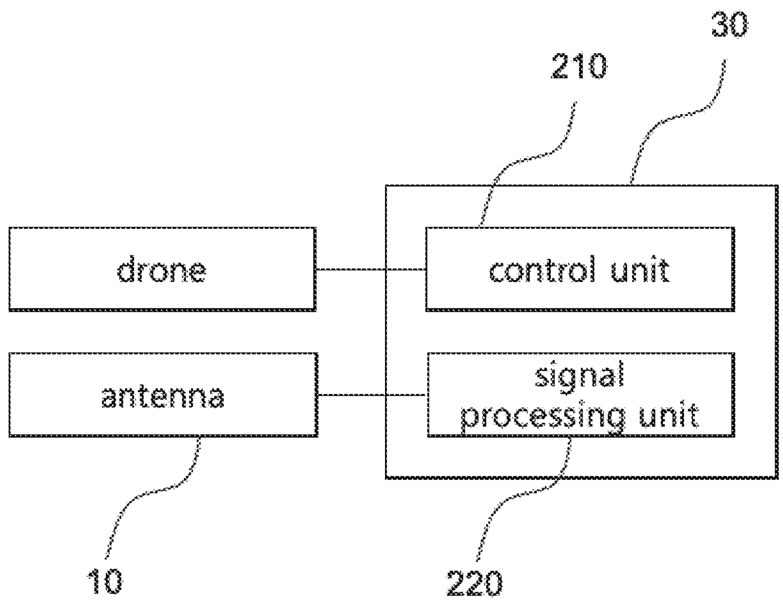
FIG. 3 is a block diagram illustrating the composition of a subminiature satellite antenna system for unmanned aerial vehicles according to an embodiment of the invention.

FIG. 1 and FIG. 2 illustrate a subminiature satellite antenna system mounted on an unmanned aerial vehicle according to an embodiment of the invention, and FIG. 3 is a block diagram illustrating the composition of a subminiature satellite antenna system for unmanned aerial vehicles according to an embodiment of the invention.

Referring to FIGS. 1 to 3, FIG. 1 shows a subminiature satellite antenna according to the present embodiment as mounted on a typical drone, while FIG. 2 shows a subminiature satellite antenna according to the present embodiment as mounted on a VTOL aircraft. A satellite antenna system for unmanned aerial vehicles according to this embodiment may include an antenna 10, a multiple number of reflector plates 20, and an antenna body 30, where the antenna body 30 may be equipped with a control unit 210 and a signal processing unit 220.

Providing an overall description of the satellite antenna system, the satellite antenna system may track a satellite through a signal recognition and stabilization function, and the antenna control unit may transmit information associated with the navigation of a ship and satellite inertia to the satellite antenna. The user may use a modem to receive emergency and aid requests and broadcasts or access telephone or Internet communications.

The satellite antenna system may include an upper radome, a lower radome, a pedestal control unit (PCU), an inertial measurement unit (IMU), a multi-RF unit (MRU), and a pedestal. The upper radome may protect the equipment from the ocean environment, and the lower radome may protect the equipment from the ocean environment and be secured to the pedestal and the body of the ship. The antenna may be a dish-shaped parabolic antenna and may serve to collect or transmit satellite signals, the PCU may be a device that searches and tracks the antenna, the IMU may check inertia information, the MRU may be a device that processes analog and digital signals received from the satellite, and the pedestal may be a mechanical structure that supports the antenna and is movable in a desired direction along each axis.

As illustrated in FIGS. 1 and 2, a satellite antenna system according to this embodiment may have multiple reflector plates 20 installed separated from one another, where each reflector plate 20 may face the antenna such that received signals from the satellite are directed to the antenna 10 or transmitted signals from the antenna 10 are directed to the satellite. According to this embodiment, a multiple number of reflector plates 20 may be installed separated from one another so as to allow the manufacture of the antenna system in a subminiature size and allow the reception of satellite signals over a broader range. Although there are empty spaces present due to the separations, the signals can be reflected over a broader range as a whole, so that the resulting effect is similar to installing a slightly larger reflector plate while reducing the weight.

Also, the antenna 10 and the reflector plates 20 can be manufactured using ultralight materials in subminiature sizes to reduce the overall weight and increase the flight efficiency of an unmanned aerial vehicle (hereinafter referred to as a drone). In other words, an ultralight subminiature satellite antenna can be manufactured, which can extend the working distance of the drone to 100 km or greater and can provide support for maintaining satellite communications in contingent events such as warfare, etc.

In one example, the reflector plates 20 can be secured to positions corresponding to the respective arms of the drone, as shown in the drawings. For instance, since a drone typically has four arms, there may be four reflector plates 20 provided correspondingly.

Although not illustrated in FIG. 1 or FIG. 2, in another embodiment of the invention, the rear face of each reflector plate 20 can be made to be curved in the opposite direction of the curve on the front face of the reflector plate 20, in order that the air moving along the rear face of the reflector plate 20 towards the arms of the aerial drone may flow more smoothly. Here, diffusors can be installed on the rear faces of the reflector plates 20, where the diffusors can have the form of partitions protruding in normal directions of the rear faces of the reflector plates 20.

Apparatuses (for instance, a signal processing unit, etc.) needed for the functioning of the satellite antenna can be provided on the antenna body 30. The signal processing unit 220 may be a device for processing the signals that are transmitted and received through the antenna 10 and can include the MRU, etc., mentioned above. Further descriptions are omitted here, as this should be apparent to the person skilled in the art.

According to another example, the overall weight can be further reduced by removing certain components that weigh more, such as the pedestal, from the antenna system. That is, while it is needed to control the direction of the antenna 10 such that the antenna 10 is kept directed towards the satellite, a control method may be used that can control the flight of the aerial drone without the use of a pedestal.

The main body of an aerial drone may be equipped with a control means for controlling each propeller, where the control means may control the direction of rotation, rotation speed, etc., of each propeller. Further descriptions are omitted here, as this should be apparent to the person skilled in the art. A control unit 210 that communicates in a wired or wireless manner with the flight control means of the drone can be included in the antenna body 30, and the control unit 210 may provide the drone with control commands associated with the flight control of the drone, for instance to control the flight such that the antenna 10 faces the target satellite. According to this embodiment, a device (such as a pedestal, etc.) for rotating the antenna 10 in different directions (such as the azimuth angle, elevation angle, etc.) can be removed to reduce the overall weight, and the flight may be controlled such that the antenna 10 is facing the direction of the satellite.

The control unit 210 may control the flight such that the drone moves only within an allowable range determined in accordance with the target flight. For example, during flight along a straight line, if the antenna 10 faces a direction that is not oriented towards the satellite, then the flight may be frequently controlled such that the antenna 10 is directed towards the satellite, while maintaining a flight course that is as close to a straight line as possible.

Figure 4:
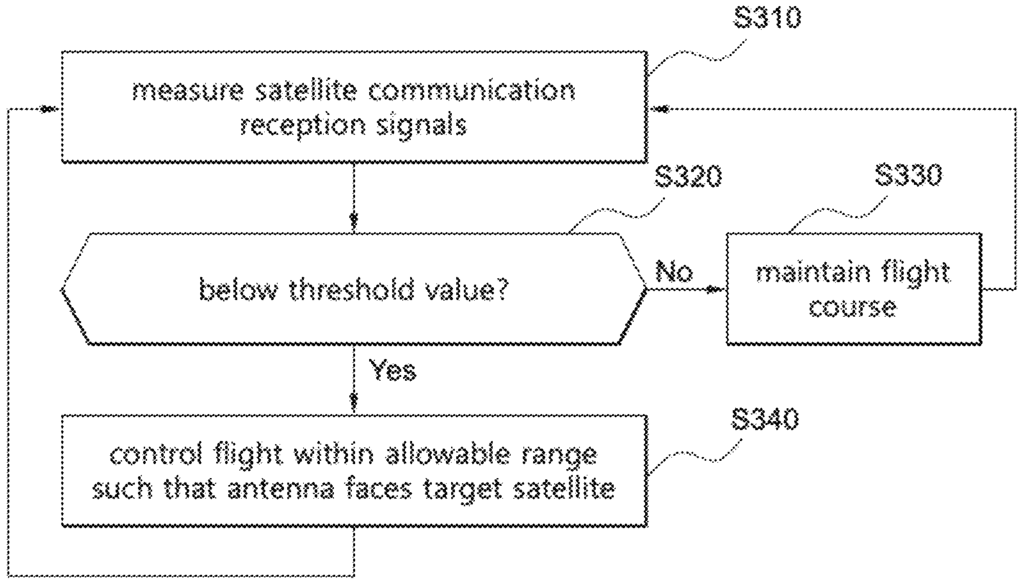
FIG. 4 is a flow diagram illustrating the procedures by which a satellite antenna for unmanned aerial vehicles according to an embodiment of the invention communicates with a satellite.

FIG. 4 is a flow diagram illustrating the procedures by which a satellite antenna for unmanned aerial vehicles according to an embodiment of the invention communicates with a satellite.

Referring to FIG. 4, the reception strength of the satellite communication signal may be measured (S310), and it may be determined whether or not the reception strength is below a threshold value (S320). This is to check whether or not the antenna is receiving the satellite signals in a stable manner. In another example, it would also be possible to use the signal-to-noise ratio (SNR) instead of or together with the reception strength. The signal-to-noise ratio is defined as Equation 1 below.

$$SNR = Ps/Pn, \qquad \text{<Equation 1>}$$

where Ps and Pn are the power of the signal (signal strength) and the power of the noise, respectively. Considering the strength of the signal power in relation to that of the noise power can represent the relative strength of the signal power. This is because the performance of a communication system is determined not by the absolute signal power but by the power of the signal in relation to the noise power. Other performance metrics of a communication system may include channel capacity, which represents the maximum achievable capacity, error rate, which represents reliability, delay rate, which represents how naturally signals are transferred, and the like.

If the results of operation S320 show that the reception strength is greater than or equal to the threshold value, then the flight course may be maintained (S330).

If, on the other hand, the reception strength is smaller than the threshold value, then the flight may be controlled within an allowable range such that the antenna faces the target satellite (S340).

According to another embodiment of the invention, the control unit can search for the satellite signal by adjusting the pitch, roll, and azimuth of the drone, if the reception strength or the signal-to-noise ratio of the satellite signal received from the target satellite remains below a threshold value for a threshold duration or longer.

Here, the pitch refers to a tilting angle along the upward and downward directions, which are perpendicular to the traveling direction of the drone, and which would cause the drone to move closer to or further away from the ground. The roll refers to a tilting angle along the left and right directions, which are perpendicular to the traveling direction of the drone, and which would not cause the drone to move closer to or further away from the ground. Lastly, the azimuth refers to the azimuth angle and represents the angle of the traveling direction. For example, when facing true north, the azimuth may be 0 degrees, and when facing northeast, the azimuth may be 45 degrees.

According to another embodiment of the invention, the control unit can move the drone to an emergency landing site for emergency landing, if the reception strength or the signal-to-noise ratio of the satellite signal received from the target satellite remains below a threshold value for a threshold duration or longer.

If the drone is unable to communicate with the target satellite continuously, it would be impossible to remotely control the drone, and thus it would be desirable to have the drone return.

If the drone were to return to the site from which it first departed, this would reveal the persons who launched and controlled drone. Thus, it may be preferable to configure the drone such that the drone lands at an emergency landing site designated beforehand.

Also, the drone may preferably further include an INS (inertial navigation system). This is because, if the drone were to return to a pre-designated emergency landing site using a satellite-based navigation apparatus such as GPS and GLONASS, the drone may perform emergency landing at a wrong site after failing to receive correct positioning information due to satellite transmission jamming or adverse weather conditions or after receiving falsified satellite signals. Thus, it may be preferable for the drone to further include an INS and return to a pre-designated emergency landing system by relying on the INS.

According to this embodiment, the parts needed for controlling the direction of the antenna can be removed from the conventional satellite antenna system by performing a method of satellite tracking based on flight control. This can reduce the overall weight and allow the mounting of a satellite antenna for an unmanned aerial vehicle.

While the foregoing provides a description with reference to a preferred embodiment of the present invention, it should be appreciated that a person having ordinary skill in the relevant field of art would be able to make various modifications and alterations to the present invention without departing from the spirit and scope of the present invention set forth in the scope of claims below.

What is claimed is:

1. A subminiature satellite antenna system for an unmanned aerial vehicle, the subminiature satellite antenna system comprising:

an antenna for transmitting and receiving signals to and from a satellite, the antenna provided on an upper portion of a main body of a drone;

a plurality of reflector plates for collecting signals to the antenna, the reflector plates installed separated from one another; and an antenna body provided on the main body of the drone, the antenna body mounted with a signal processing unit configured to process the signals transmitted and received by the antenna, and a control unit mounted on the antenna body, the control unit configured to control a flight of the drone such that the antenna faces a target satellite, wherein the reflector plates are formed in shapes of halved dishes and are installed to face the antenna, wherein the reflector plates are secured in corresponding positions on respective arms of the drone, wherein the control unit controls the flight of the drone such that the drone moves only within an allowable range determined according to a target flight, wherein the control unit controls the flight of the drone only when a reception strength or a signal-to-noise ratio of satellite signals received from the target satellite is below a threshold value, wherein the control unit controls the flight of the drone by adjusting a pitch, a roll, and an azimuth of the drone if the reception strength or the signal-to-noise ratio of the satellite signals received from the target satellite remains below the threshold value for a threshold duration or longer, wherein the rear face of each reflector plate can be made to be curved in the opposite direction of the curve on the front face of the reflector plate, in order that the air moving along the rear face of the reflector plate towards the arms of the aerial drone may flow more smoothly, and wherein diffusors are installed on the rear faces of the reflector plates, the diffusors having the form of partitions protruding in normal directions of the rear faces of the reflector plates, wherein a device for rotating the antenna in different directions is removed to reduce the overall weight, and wherein the control unit controls the flight such that the antenna faces the direction of the satellite, and wherein, if the antenna faces a direction that is not oriented towards the satellite during flight along a straight line, the control unit controls the flight such that the antenna is directed towards the satellite, while maintaining a flight course that is as close to a straight line as possible.

* * * * *